(12) United States Patent
Cocchi et al.

(10) Patent No.: US 10,712,094 B2
(45) Date of Patent: Jul. 14, 2020

(54) MACHINE FOR MAKING AND DISPENSING A LIQUID OR SEMI-LIQUID PRODUCT

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.-CARPIGIANI, Cernusco Sul (IT)

(*) Notice: Subject to any disclaimer, the term of this patent is extended or adjusted under 35 U.S.C. 154(b) by 234 days.

(21) Appl. No.: 15/882,365

(22) Filed: Jan. 29, 2018

(65) Prior Publication Data

US 2018/0231318 A1    Aug. 16, 2018

(30) Foreign Application Priority Data

Feb. 14, 2017 (IT) .................. 202017000016360

(51) Int. Cl.
*A23G 9/04* (2006.01)
*A23G 9/08* (2006.01)
(Continued)

(52) U.S. Cl.
CPC .......... *F28D 1/0213* (2013.01); *A23G 9/045* (2013.01); *A23G 9/08* (2013.01); *A23G 9/22* (2013.01);
(Continued)

(58) Field of Classification Search
CPC .......... A23G 9/086; A23G 9/045; A23G 9/22; A23G 9/225; A23G 9/227; A23G 9/228
See application file for complete search history.

(56) References Cited

U.S. PATENT DOCUMENTS 6,058,721 A * 5/2000 Midden .................. A23G 9/045
62/136
2001/0035016 A1   11/2001 Weber et al.
(Continued)

FOREIGN PATENT DOCUMENTS

EP    1980156 A1    10/2008
EP    2084971 A2     8/2009
(Continued)

OTHER PUBLICATIONS

European Search Report dated Jul. 5, 2018 from counterpart EP App No. 18155245.6.

*Primary Examiner* — Cassey D Bauer
(74) *Attorney, Agent, or Firm* — Shuttleworth & Ingersoll, PLC; Timothy J. Klima

(57) ABSTRACT

A machine for making and dispensing cold or ice beverages, such as cool drinks, slushes, sorbets and the like, comprising at least: a containment and processing tank for the product to be dispensed which has a front wall, which is equipped at the bottom with a dispensing mouth for dispensing the beverage, a dispenser, located at the beverage dispensing mouth and able to be turned on or off to allow the beverage to be dispensed; a thermal treatment cylinder located inside the containment tank; a stirrer located outside an outer surface of said thermal treatment cylinder and adapted to rotate about a respective axis of rotation; a refrigerating plant comprising a first exchanger, a second heat exchanger, a pressure reducing unit and a compressor, the first heat exchanger being located inside said thermal treatment cylinder, a containment compartment for the second heat exchanger, a pressure reducing unit and a compressor.

14 Claims, 7 Drawing Sheets

(51) Int. Cl.
*A23G 9/22* (2006.01)
*F28D 1/02* (2006.01)
*F25D 31/00* (2006.01)

(52) U.S. Cl.
CPC ............ *A23G 9/224* (2013.01); *A23G 9/228* (2013.01); *F25D 31/006* (2013.01); *F25D 2323/122* (2013.01)

(56) References Cited

U.S. PATENT DOCUMENTS

2005/0229622 A1    10/2005  Franck et al.
2017/0094990 A1*    4/2017  Mohammed ...... F16K 31/52408

FOREIGN PATENT DOCUMENTS

| GB | 2530465 A | 3/2016 |
|---|---|---|
| WO | 2014091393 A1 | 6/2014 |

\* cited by examiner

MACHINE FOR MAKING AND DISPENSING A LIQUID OR SEMI-LIQUID PRODUCT

This application claims priority to Italian Patent Application IT202017000016360 filed Feb. 14, 2017, the entirety of which is incorporated by reference herein.

BACKGROUND OF THE INVENTION

This innovation relates to a machine for making and dispensing a liquid or semi-liquid food product, in particular cold products such as slushes, sorbets, cold creams, soft ice cream, etc.

A particularly strongly felt need in the sector in question is that of being able to have available a machine that is particularly simple and energy efficient.

In fact, a widespread need now is that of being able to have available a machine that is very efficient in terms of energy, especially as regards heat exchange with the elements of the refrigerating plant which are adapted to release heat (compressor, condenser, etc.).

SUMMARY OF THE INVENTION

The aim of this innovation is therefore to meet the above-mentioned requirements by providing a machine for making and dispensing a liquid or semi-liquid food product, in particular but not limited to products such as slushes, sorbets, cold creams, soft ice cream, etc. which is energy efficient.

In particular, the aim of this innovation is to provide a machine for making a liquid or semi-liquid food product, in particular but not limited to products such as slushes, sorbets, creams, soft ice cream, etc., that allows optimum disposal of the heat produced by the different operating elements of the machine.

These and other aims are substantially achieved by the machine for making liquid or semi-liquid products as described in the appended claims.

Further features and advantages are more apparent in the detailed description of a non-limiting example embodiment of the innovation.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a non-limiting example embodiment of the invention, and in which:

DESCRIPTION OF THE PREFERRED EMBODIMENTS

Figure 1:
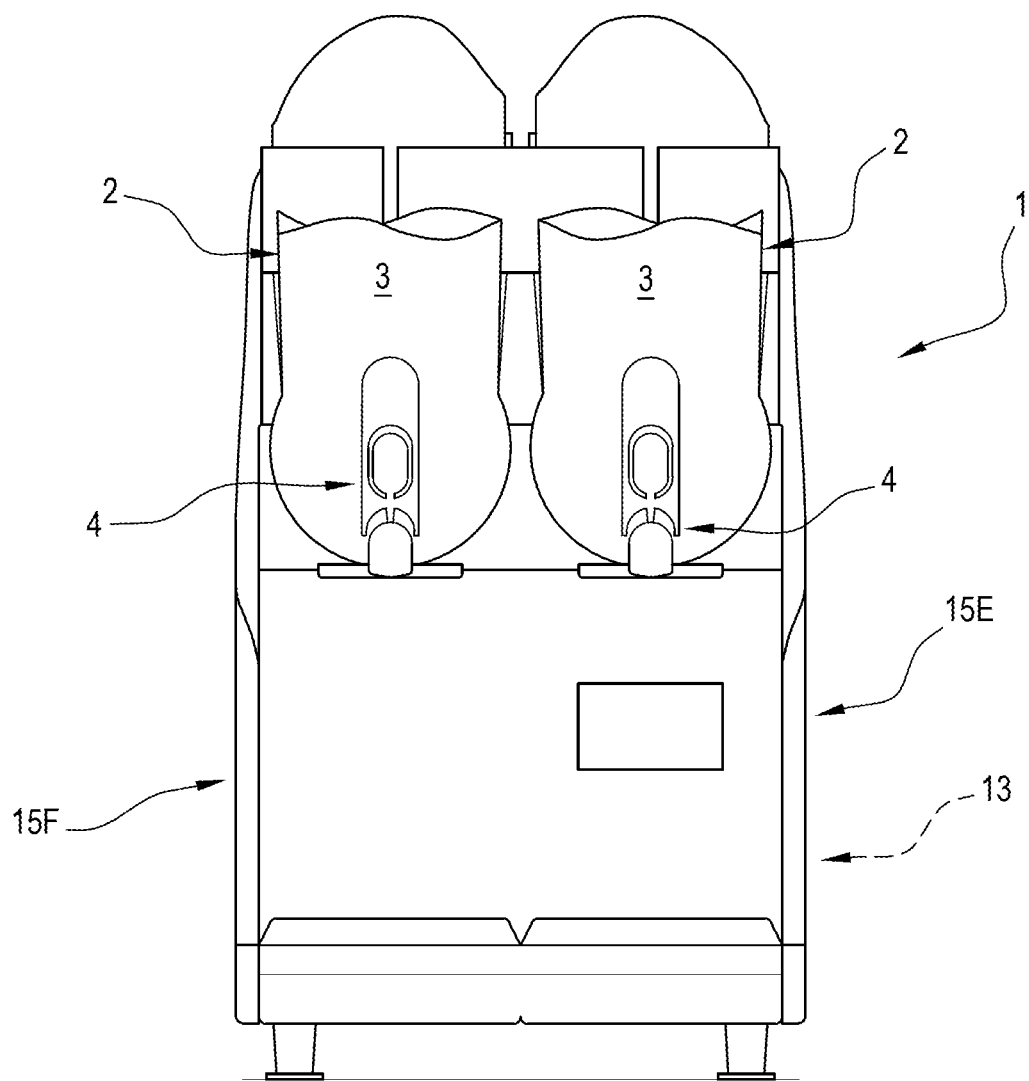
FIGS. 1 to 3 illustrate the machine according to the innovation.
Figure 2:
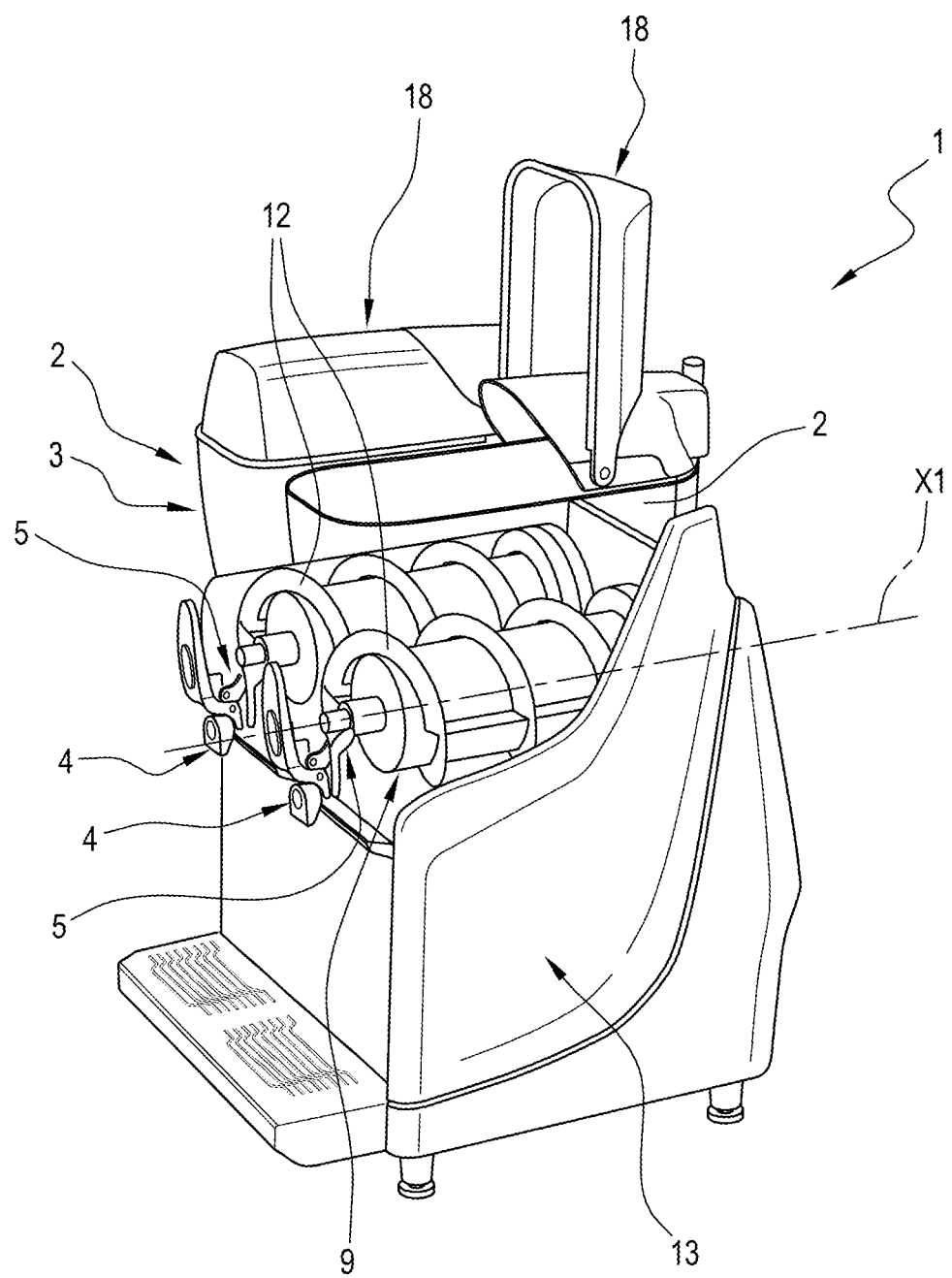
Figure 3:
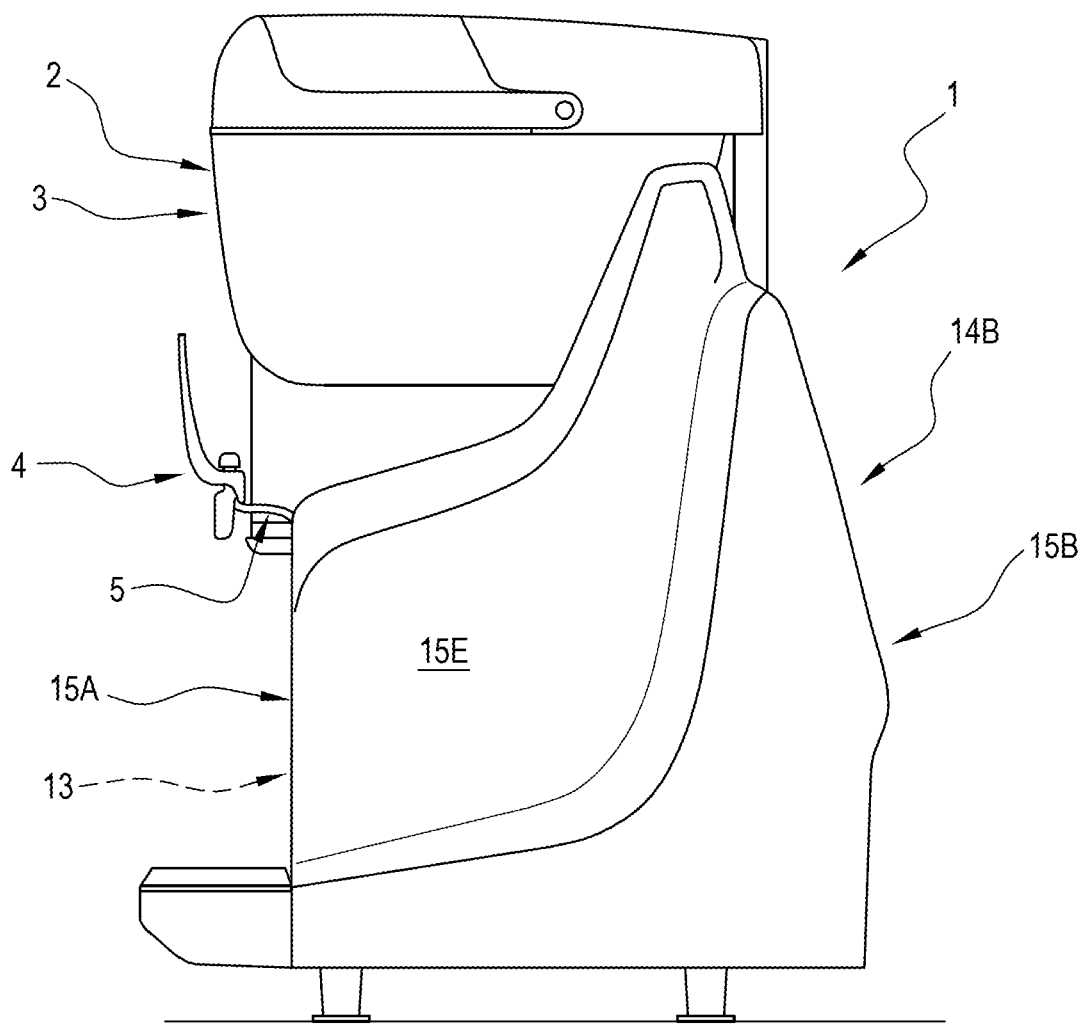
Figure 4:
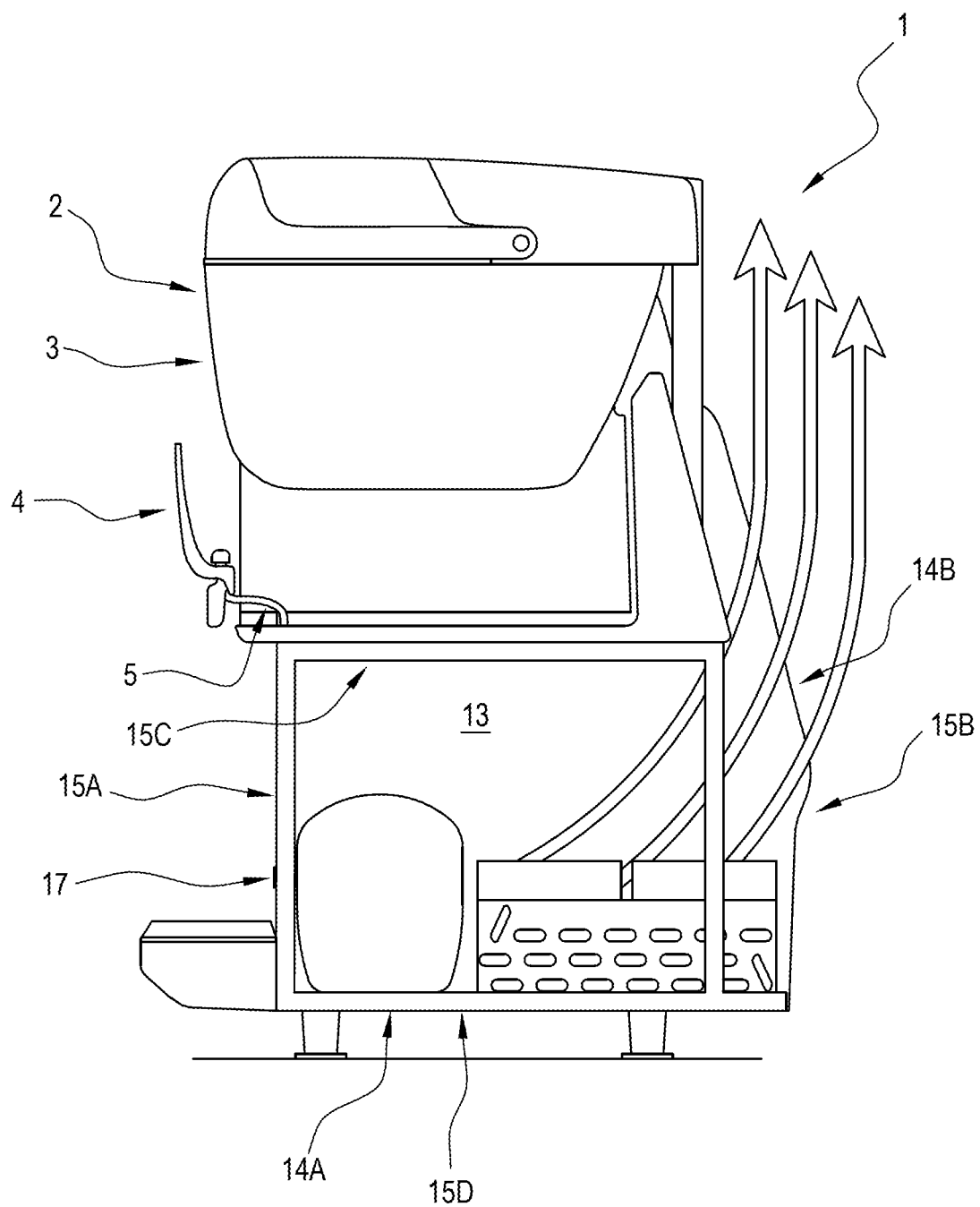
FIG. 4 is a schematic view of the machine, with some parts cut away to better illustrate the cooling airflow in the machine 1.

With reference to the accompanying drawings, the numeral 1 denotes a machine for making cold products (that is to say, products suitable for being made at a temperature below 0° C.) such as slushes, sorbets, creams, soft ice cream, cold creams, etc.

More generally, the machine 1 is adapted to make and dispense cold or ice beverages.

The machine 1 for making and dispensing cold or ice beverages, such as cool drinks, slushes, sorbets and the like, comprises at least:

a containment and processing tank 2 for the product to be dispensed which has a front wall 3, which is equipped at the bottom of it with a dispensing mouth 5 for dispensing the beverage, a dispenser 4, located at the beverage dispensing mouth 5 and able to be turned on or off to allow the beverage to be dispensed;

a thermal treatment cylinder 8 located inside the containment tank 2;

a stirrer 12 located outside an outer surface of said thermal treatment cylinder 8 and adapted to rotate about a respective axis of rotation X1;

a refrigerating plant 10 comprising a first exchanger 6, a second heat exchanger 7, a pressure reducing unit 16 and a compressor 11, the first heat exchanger 6 being located inside said thermal treatment cylinder 8, a containment compartment 13 at least for the second heat exchanger 7 and the compressor 11.

The machine 1 further comprises at least one first airflow intake cavity 14A in fluid communication with said containment compartment 13 and with the outside environment and at least one second airflow release cavity 14B in fluid communication with said containment compartment 13 and with the outside environment.

It should be noticed that said second release cavity 14B is located above the first intake cavity 14A (that is to say, higher up), so as to create an airflow with a component moving from the bottom upwards.

In use, the fact that the first intake cavity 14A and the second release cavity 14B are at two different heights means that it is possible to create an airflow that passes through the inner compartment 13.

It should be noticed that, preferably, the airflow has a vertical (ascending) component and a horizontal component (directed from the front part of the machine 1 to the back part of it).

With reference to the stirrer 12, it should be noticed that said stirrer 12 is a helical stirrer.

It should be noticed that the thermal treatment cylinder 8 comprises a longitudinal inner cavity (not illustrated), in which a motion transmission shaft passes freely.

The motion transmission shaft (not illustrated) is coupled to the stirrer 12, preferably to the front portion of the stirrer 12.

Preferably, the machine 1 also comprises an (electronic) control and drive unit U.

Even more preferably, the machine 1 comprises a selection interface I, operatively acting on said (electronic) control and drive unit U for adjusting the operation of one or more elements of the machine 1.

Figure 5:
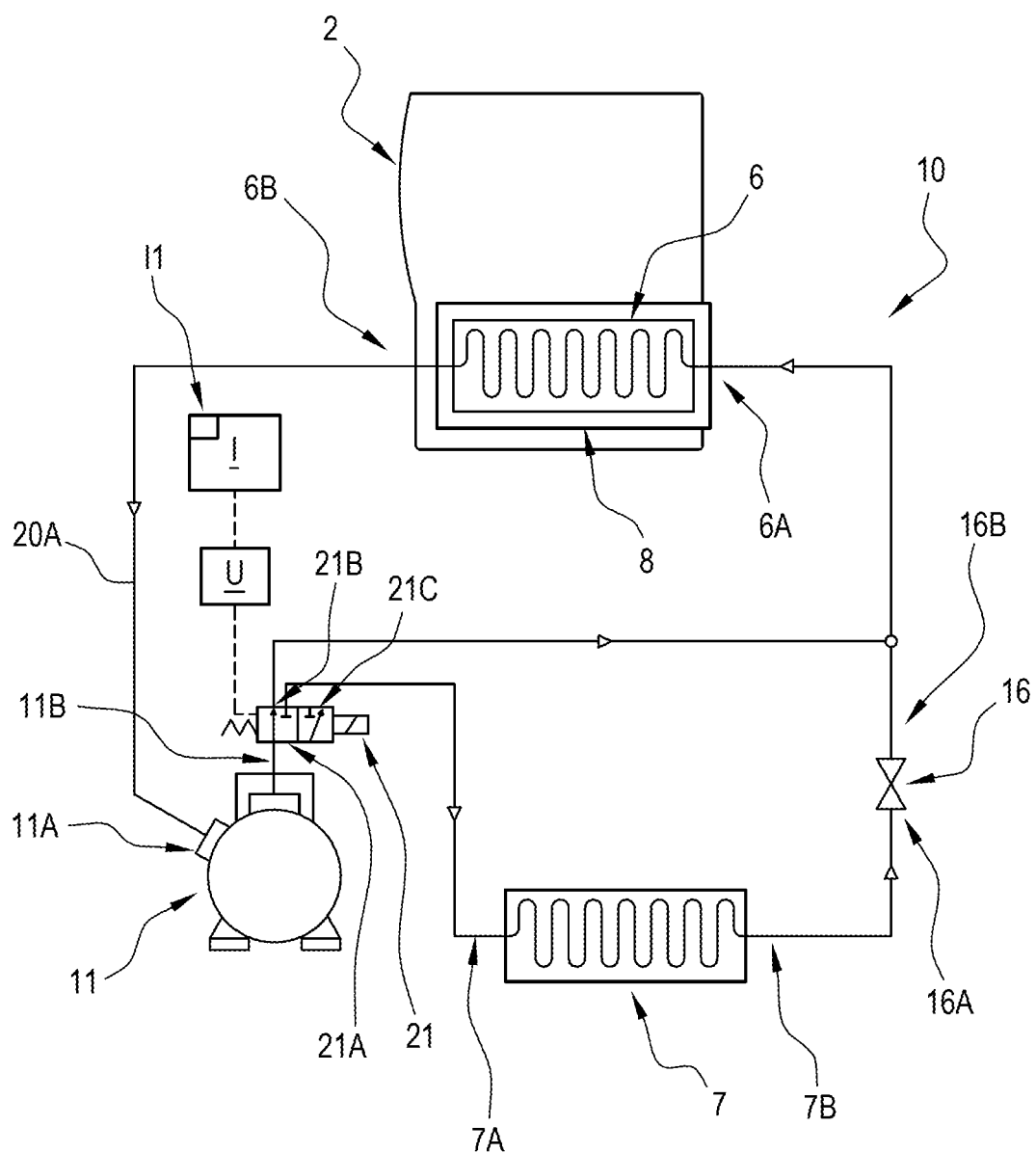
FIG. 5 is a schematic view of a first embodiment of the thermal treatment plant of the machine according to the innovation.

There follows a description of the refrigerating plant 10, with particular reference to what is illustrated in the appended FIG. 5.

In particular, as illustrated in FIG. 5, the refrigerating plant 10 preferably comprises a first pipe 20A connecting the first exchanger 6 to the compressor 11, in particular a pipe connecting the outfeed 6B of the first exchanger 6 to the infeed 11A of the compressor 11.

The machine 1 comprises, downstream of said compressor 11 (with reference to the direction of normal circulation of the refrigerant fluid), a selective connecting unit 21.

The selective connecting unit 21 is configured for alternately connecting the outfeed 11B of the compressor 11 to the infeed 6A of the first exchanger 6 or to the infeed 7A of the second exchanger 7.

It should be noticed that the selective connecting unit 21 is adapted to operate between a first configuration, in which it connects the outfeed 11B of the compressor to the infeed 6A of the first exchanger, and a second configuration in which it connects the outfeed 11B of the compressor to the infeed 7A of the second exchanger 7.

It should be noticed that, preferably, the control unit U is operatively connected to the selective connecting unit 21, for controlling it in such a way as to switch it to the two configurations, that is to say, the first configuration and the second configuration.

Preferably, the selective connecting unit 21 is a multi-way valve, with one infeed and two outfeeds.

More generally, the selective connecting unit 21 is equipped with one infeed and two outfeeds.

The valve, or more generally the selective connecting unit 21, is configured to, selectively and alternately, put its own infeed 21A in fluid communication with one or the other of its own outfeeds (21B, 21C).

Preferably, the control unit U controls the selective connecting unit 21.

It should be noticed that the selective connecting unit 21 is normally in the first configuration when the machine 1 is in a production mode: in this mode the first exchanger 6 removes heat from the product in the tank 2, that is to say, a thermodynamic cooling cycle is carried out (preferably with vapor compression).

It should be noticed that the refrigerating plant 10 comprises a circuit in which a thermal carrier fluid is present, circulating in the compressor 11, first exchanger 6, second exchanger 7 and pressure reducing (i.e.: throttling) unit 16.

It should be noticed that the selective connecting unit 21 is normally in the second configuration when the machine 1 is in a defrost mode: in this mode the first exchanger 6 transfers heat to the surface of the cylinder 8 located in the tank 2.

It should be noticed that, in that second configuration, the plant 10 implements a "hot gas" technique, in which the first exchanger 6 transfers heat into the tank; in use, the refrigerant fluid, in the form of a gas is made to recirculate between the compressor and the first exchanger 6.

The refrigerant fluid, in the form of a gas heats up and transfers heat to the cylinder 8.

According to one aspect, the selection interface I comprises at least one control 11 for setting the configuration of the selective connecting unit 21 (between the first and the second operating modes), that is to say, for switching between the two configurations.

It should be noticed that the plant 10 comprises, at the outfeed 7B of the second exchanger 7, that is to say, downstream of the second exchanger 7, the pressure reducing unit 16.

In other words, the outfeed 7B of the second exchanger 7 is connected to the infeed 16A of the pressure reducing unit 16.

In contrast, the infeed 7A of the second exchanger 7 is connected to an outfeed 21C of the connecting unit 21.

Said pressure reducing unit 16 is preferably a throttle (expansion) valve.

Preferably, the outfeed 16B of the pressure reducing unit 16 is connected to the infeed 6A of the first exchanger 6.

Figure 6:
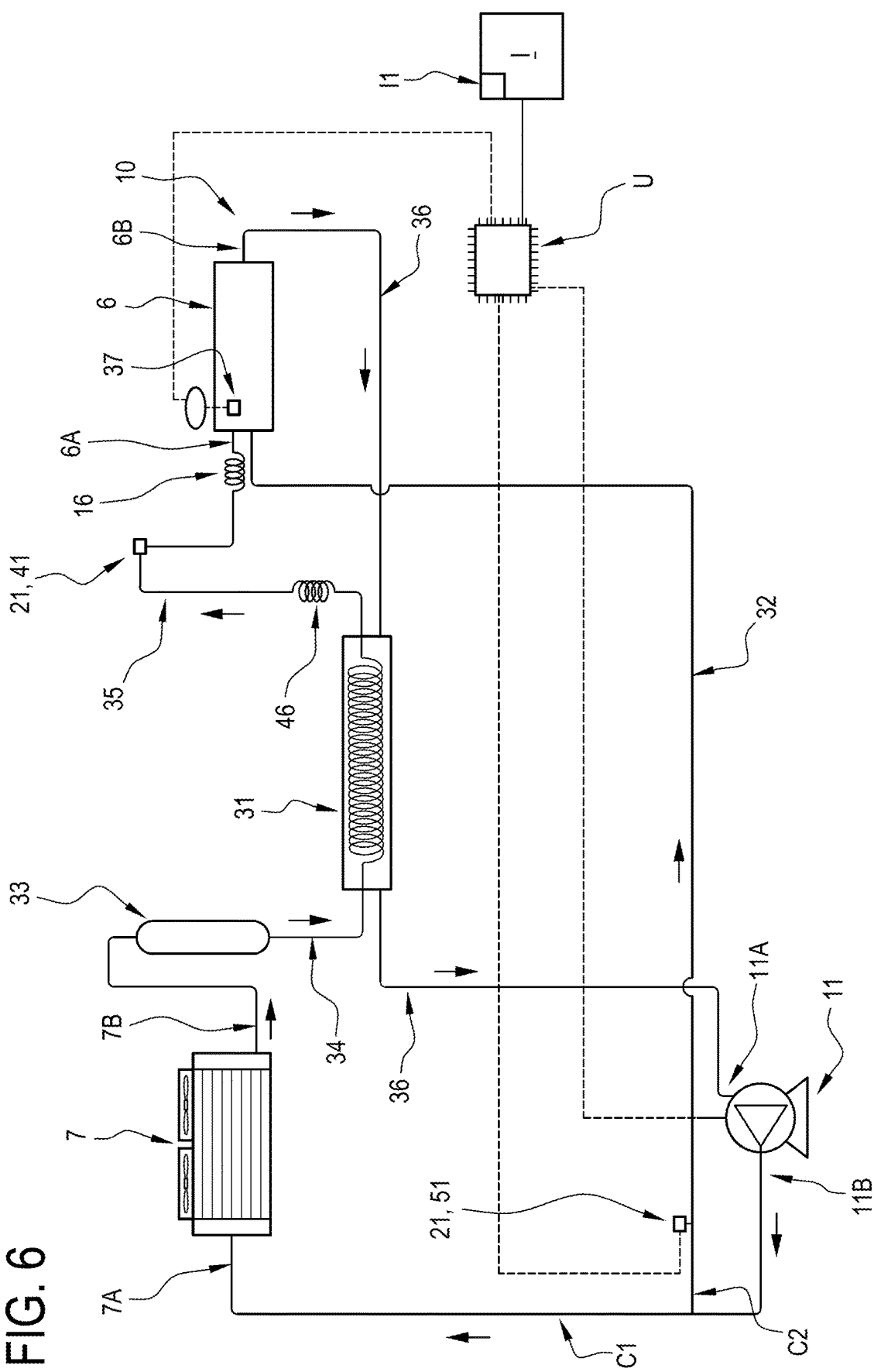
FIG. 6 is a schematic view of a second embodiment of the thermal treatment plant of the machine according to the innovation.

There follows a description of the thermal treatment plant 10, with particular reference to what is illustrated in the appended FIG. 6 (first embodiment).

FIG. 6 shows a thermal treatment plant 10 for a tank 2, that is to say, adapted to cool the product in a tank 2.

In particular, as illustrated in FIG. 6, the thermal treatment plant 10 preferably comprises a first pipe 36 connecting the first exchanger 6 to the compressor 11, in particular a pipe 36 connecting the outfeed 6B of the first exchanger 6 to the infeed 11A of the compressor 11.

It should be noticed that located in said pipe 36 there is a further heat exchanger 31, which is interposed between the compressor 11 and the first exchanger 6, in particular located between the infeed 11A of the compressor 11 and the outfeed 6B of the first exchanger 6 (along said pipe 36).

The selective connecting unit 21 comprises at least one first valve 41, associated with the first circuit for closing it/opening it and at least one second valve 51, associated with the second circuit for closing it/opening it.

It should be noticed that the first and second circuits share several components and pipes, whilst from the outfeed 11B of the compressor to the infeed 6A of the first exchanger said first and second circuits have two pipes C1,C2 (branches of the circuit) that are separate and parallel.

The selective connecting unit 21 is operatively active on each of said two pipes C1,C2 (branches of the circuit) that are separate and parallel.

In particular, the first valve 41 is active on the pipe C1 whilst the second valve is active on the pipe C2.

Preferably, the first valve 41 and the second valve 51 are switched simultaneously.

Therefore, the control unit is configured for controlling the first valve 41 and the second valve 51 in such a way as to switch them simultaneously.

More precisely, when the first valve 41 is open and the second valve 51 is closed, and vice versa.

The second valve 51 is located downstream of said compressor 11 (with reference to the direction of normal circulation of the refrigerant fluid), for closing a pipe 32 (which is part of the plant 10).

The pipe 32 connects the outfeed 11B of the compressor with the infeed 6A of the first exchanger 6.

Said valve 51 allows the pipe 32 to be opened or closed, that is to say, it may be switched between a closed configuration of the pipe 32 and an open configuration of the pipe 32.

Therefore, it should be noticed that with the second valve 51 in the closed configuration, the thermal carrier fluid passes through the second exchanger 7, the auxiliary exchanger 31, the pressure reducing unit 16, the first exchanger 6 and the compressor 11, that is to say, it circulates along the entire first circuit.

In that situation, the first valve 41 is open.

In that situation, the second valve 51 is closed.

The first valve 41 and the second valve 51 are located on parallel branches C1, C2 which connect, respectively, the outfeed 11B of the compressor 11 with the infeed 6A of the first exchanger 6.

More precisely, in that closed configuration, the thermal plant 10 allows a vapor-compression thermodynamic cycle to be carried out (the fluid flows in the first circuit, performing a vapor-compression thermodynamic cycle between the various components).

It should be noticed that, according to that thermodynamic cycle, the first heat exchanger 6 absorbs heat from the liquid or semi-liquid product in the tank 2, cooling the liquid or semi-liquid product.

In contrast, it should be noticed that in the heating configuration of the selective connecting unit 21, the thermal carrier fluid flows through the first exchanger 6, the compressor 11, the pipe 32 and the further exchanger 31, that is to say, along the second circuit.

More precisely, in that heating configuration of the selective connecting unit 21, the thermal plant 10 carries out a hot gas thermodynamic cycle.

It should be noticed that in the heating configuration of the selective connecting unit 21, the second valve 51 is open whilst the first valve 41 is closed.

It should be noticed that, according to that hot gas thermodynamic cycle, the first heat exchanger 6 transfers heat to the liquid or semi-liquid product in the tank 2, defrosting the liquid or semi-liquid product.

Preferably, the control unit U controls the selective connecting device 21.

It should be noticed that the selective connecting device 21 is normally in the first configuration when the machine 1 is in a production mode: in this mode the first exchanger 6 removes heat from the product in the tank 2, that is to say, a thermodynamic cooling cycle is carried out (preferably a vapor-compression thermodynamic cycle).

It should be noticed that the selective connecting unit 21 is normally in the second heating configuration when the machine 1 is in a defrost mode: in this mode the first exchanger 6 transfers heat to the surface of the cylinder 8 located in the tank 2.

It should be noticed that, in that second configuration, the plant 10 implements a "hot gas" technique, in which the first exchanger 6 transfers heat into the tank; in use, the refrigerant fluid, in the form of a gas is made to recirculate between the compressor 11 and the first exchanger 6.

The refrigerant fluid, in the form of a gas heats up and transfers heat to the cylinder 8 due to circulation in the second circuit and in particular due to heating in the compressor 11.

In this way, advantageously, it is possible to extremely quickly defrost, for cleaning and/or maintenance, the product accumulated in the tank 2.

It should be noticed that said operation is normally carried out by the operators when the product in the tank 2 needs to be substituted, because it has been in the tank 2 for too long, which is incompatible with food safety and/or selling.

Thanks to the defrost technique implemented above, the time required for that operation is significantly reduced.

It should be noticed that switching between the first and second configurations of the selective connecting unit 21 may occur at any time, when production, maintenance or cleaning require the switch to one or the other configuration (first or second).

According to one aspect, the selection interface I comprises at least one control 11 for setting the configuration of the selective connecting unit 21 (between the first and the second configuration), that is to say, for switching between the two configurations.

It should be noticed that the plant 10 comprises, at the outfeed 7B of the second exchanger 7, that is to say, downstream of the second exchanger 7, the pressure reducing unit 16.

More precisely, the second exchanger 7 is connected to the further exchanger 31 by means of a pipe 33.

The further exchanger 31 is connected to the first exchanger 6 by means of a pipe 35.

It should be noticed that located in said pipe 35 is the pressure reducing unit 16, which is therefore operatively interposed (in the first circuit) between the further exchanger 31 and the first exchanger 6.

Said throttling unit 16 is preferably a throttle valve.

Preferably, the outfeed 16B of the throttling unit 16 is connected to the infeed 6A of the first exchanger 6.

It should be noticed that the outfeed 6B of the first exchanger is connected to the infeed 11A of the compressor by means of a pipe 36 (that pipe 36 is shared by the first and second circuit).

In particular, said pipe 36 affects the further exchanger 31.

Preferably, the plant 10 comprises an additional pressure reducing element 46, located in the pipe 35 upstream of the pressure reducing unit 16 (more precisely between the additional exchanger 31 and the pressure reducing unit 16).

Said additional pressure reducing element 46 is part of the first circuit.

There follows a description of further aspects relating to the machine 1.

It should be noticed that, preferably, the machine 1 comprises a sensor 37, associated with the tank 2, and adapted to detect a parameter (shape, geometry, quantity) concerning the ice present in the tank 2.

Said parameter may be, for example, one or more of the following: the quantity of ice, the dimensions (medium or maximum) of the ice crystals, etc.

Preferably, the control unit U is configured for adjusting one or more components of the thermal treatment plant 10 based on the signal of said sensor 37, in particular when the selective connecting unit 21 is in the first cooling configuration (that is to say, the machine 1 is in the production mode).

It should be noticed that, preferably, according to the above aspect, the control unit U is configured for adjusting the power (in particular the speed) of the compressor 11.

Preferably, the control unit U is configured for automatically switching the selective connecting unit 21 from the first cooling configuration to the second heating configuration (that is to say, for automatically switching from the production mode to the defrost mode).

It should be noticed that, preferably, the control unit U is configured for automatically switching the selective connecting unit 21 from the first cooling configuration to the second heating configuration based on a machine operating parameter.

Preferably, said machine operating parameter comprises a parameter that is one or more of the following: product temperature in the tank 2, temperature of the outside environment, product consistency, stirrer motor absorption, etc.

Preferably, according to this aspect, the machine 1 comprises one or more sensors adapted to detect a machine operating parameter (in particular a parameter that is one or more of the following: product temperature in the tank 2, temperature of the outside environment, product consistency, stirrer motor absorption, etc.).

Therefore, the control unit U is electrically connected to said one or more sensors for automatically switching the selective connecting unit 21 from the first cooling configuration to the second heating configuration based on a machine operating parameter detected by said one or more sensors.

Preferably, defrosting occurs as follows.

Defrosting comprises an initial heating step.

The selective connecting unit 21 is first switched from the first cooling configuration to the second heating configuration, so as to heat the product, that is to say, product residues, in the tank 2.

In this step, the compressor 11 is kept active.

Then, defrosting comprises a step of switching the selective connecting unit 21 from the second heating configuration to the first cooling configuration.

In this way, the product in the tank 2 is cooled.

Figure 7:
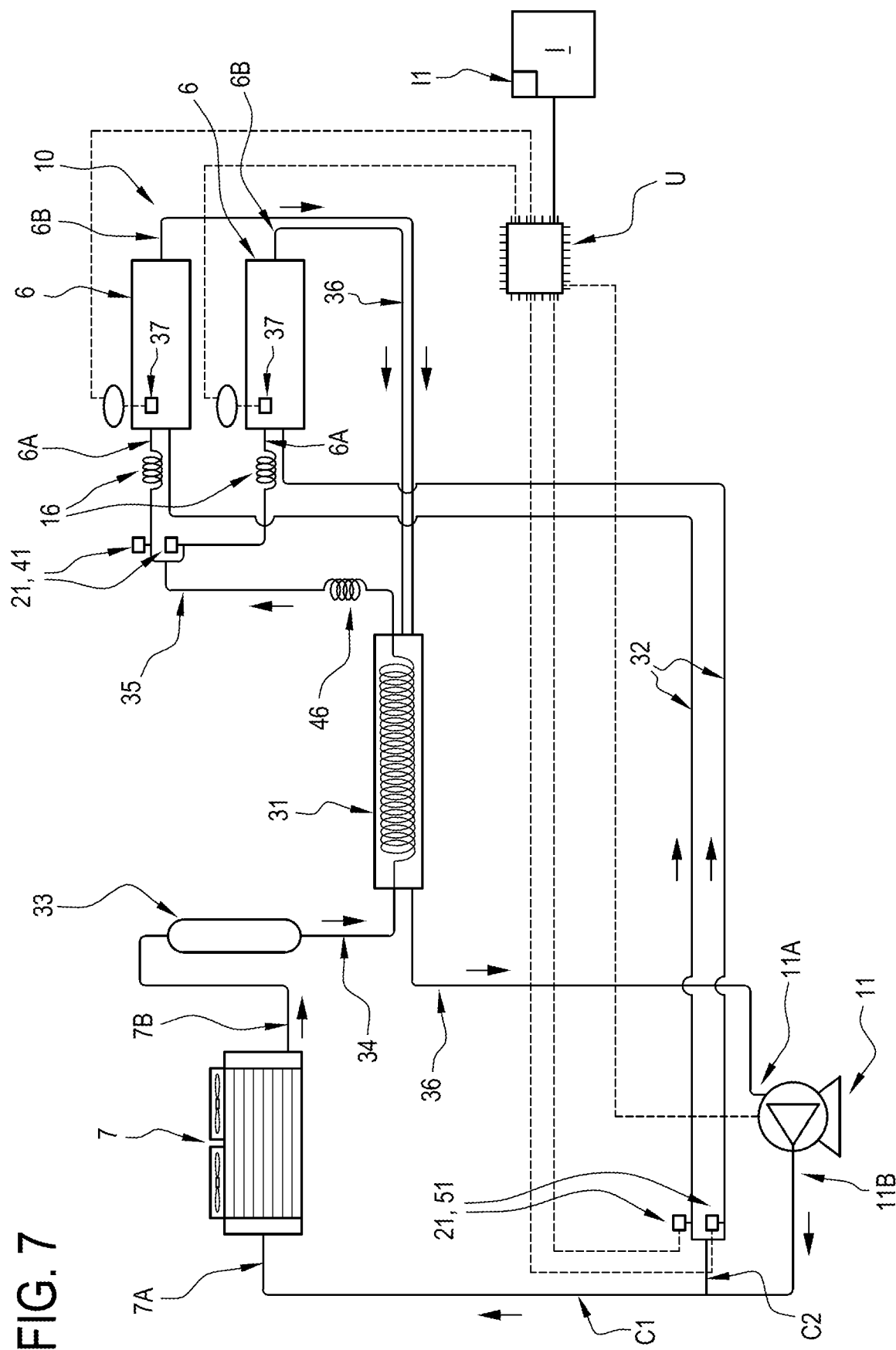
FIG. 7 is a schematic view of a third embodiment of the thermal treatment plant of the machine according to the innovation.

FIG. 7 shows a machine 1 with two tanks and a single thermal treatment plant 10 (which allows thermal treatment of the product in both tanks 2).

It should be noticed that the two tanks 2 may be independent, that is to say, each tank 2 may be kept in production, defrosting, or inactive independently of the other.

The embodiment of the thermal treatment plant 10 in FIG. 7 is a single thermal treatment plant 10 for both tanks 2.

According to an alternative embodiment, defrosting may be carried out by means of manual activation.

In the machine 1, advantageously, an ascending vertical cooling airflow is created, which strikes the components of the machine 1 belonging to the refrigerating plant 10 which are adapted to release thermodynamic heat (preferably the compressor 11 and the second exchanger 11).

In this way, the machine 1 is energy efficient, since the cooling flow that is established by the arrangement of the first airflow intake cavity 14A and the second airflow release cavity 14B is optimum for extremely rapid removal of the heat from the second exchanger 7, thereby maximizing the energy efficiency of the machine 1.

According to another aspect, the containment compartment 13 is formed by a front wall 15A, by a rear wall 15B, by an upper wall 15C, by a lower wall 15D, and by a pair of lateral walls (15E, 15F), right and left.

It should be noticed that the containment compartment 13 is located below the containment tank 2.

Preferably, the machine 1 comprises a frame 17 and one or more of the front wall 15A, the rear wall 15B, the upper wall 15C, the lower wall 15D, and the pair of lateral walls (15E, 15F), right and left, are removable relative to the frame 17.

Preferably, said frame 17 is formed by one or more vertical members.

It should be noticed that, preferably, the compressor 11 is located above the lower wall 15D.

It should be noticed that, preferably, the second exchanger 7 is located above the lower wall 15D.

Preferably, the airflow (natural or with forced circulation) strikes the second exchanger 7; more preferably, said airflow also strikes the compressor 11.

It should be noticed that, preferably, the machine 1 is equipped with a lid 18 hinged to the containment tank 2, for allowing loading of the basic product to be processed.

Preferably, the first intake cavity 14A is made in the lower wall 15D.

Even more preferably, the first intake cavity 14A is made in the front wall 15A.

According to another aspect, the first intake cavity 14A is made in one of the lateral walls (15E, 15F).

According to another aspect, the second release cavity 14B is made in the rear wall 15B.

According to another aspect, the second release cavity 14B is made in one of the lateral walls (15E, 15F).

It should be noticed that the machine 1 may comprise a plurality of first intake cavities 14A, and a plurality of second release cavities 14B.

In such a case, preferably the first intake cavities 14A are made in the front and/or lower wall, and/or in the lateral walls, whilst the second release cavities 14B are made in the rear wall and/or in the lateral walls.

Said intake cavity 14A and/or release cavity 14B may be made in the form of an opening or of a slit or of any interruption (including absence) of one of the walls of the containment compartment 13.

According to another aspect, the machine 1 may comprise a fan, located in said containment compartment 13, for generating a forced (ascending) cooling airflow.

With reference to the accompanying figures, it should be noticed that they show a double machine.

In this case, that machine is equipped with two product processing and dispensing units, each comprising:

a containment and processing tank 2 for the product to be dispensed which has a front wall 3, which is equipped at the bottom of it with a dispensing mouth 5 for dispensing the beverage, a dispenser 4, located at the beverage dispensing mouth 5 and able to be turned on or off to allow the beverage to be dispensed;

a thermal treatment cylinder 8 located inside the containment tank 2;

a stirrer 12 located outside an outer surface of said thermal treatment cylinder 8 and adapted to rotate about a respective axis of rotation X1.

With reference to the refrigerating plant 10, the double machine 1 may comprise two independent refrigerating plants, each adapted to cool and/or heat the products in one tank 2 or a single, shared refrigerating plant.

In any case, the machine 1 comprises two first heat exchangers 6, each associated with one of the thermal treatment cylinders 8.

What is claimed is:

1. A machine for making and dispensing a cold or ice beverage, comprising:

a containment and processing tank for the beverage which includes a front wall, and at a bottom, a dispensing mouth for dispensing the beverage, a dispenser, located at the dispensing mouth and suitable for turning on or off to allow the beverage to be dispensed;

a thermal treatment cylinder located inside the containment and processing tank;

a stirrer located outside an outer surface of the thermal treatment cylinder and adapted to rotate about a respective axis of rotation;

a refrigerating plant comprising a first heat exchanger, a second heat exchanger, a pressure reducing element and a compressor, the first heat exchanger being located inside the thermal treatment cylinder, a containment compartment for the second heat exchanger and the compressor, at least one first airflow intake cavity in fluid communication with the containment compartment and with an outside environment and at least one second airflow release cavity in fluid communication with the containment compartment and with the outside environment, the at least one second airflow release cavity being located above the at least one first airflow intake cavity to create an airflow with a vertical component, from a bottom upwards;

wherein the containment compartment is formed by a front wall, a rear wall, an upper wall, a lower wall, and a pair of lateral walls, right and left;

wherein the machine comprises a frame and one or more of the front wall, the rear wall, the upper wall, the lower wall, and the pair of lateral walls, right and left, are removable relative to the frame;

wherein the at least one first airflow intake cavity is positioned in the lower wall.

2. The machine according to claim 1, wherein the frame is formed by one or more vertical members.

3. The machine according to claim 1, wherein the containment compartment is located below the containment and processing tank.

4. The machine according to claim 1, wherein the at least one first airflow intake cavity is positioned in the front wall.

5. The machine according to claim 1, wherein the at least one first airflow intake cavity is positioned in one of the lateral walls.

6. The machine according to claim 1, wherein the at least one second airflow release cavity is positioned in the rear wall.

7. The machine according to claim 1, wherein the at least one second airflow release cavity is positioned in one of the lateral walls.

8. The machine according to claim 1, and further comprising a fan, located in the containment compartment, for generating a forced cooling airflow from the at least one first airflow intake cavity to the at least one second airflow release cavity in the containment compartment.

9. The machine according to claim 1, wherein the pressure reducing element is a throttle valve.

10. The machine according to claim 1, wherein the compressor is located above the lower wall.

11. The machine according to claim 1, wherein the second heat exchanger is located above the lower wall.

12. The machine according to claim 1, and further comprising a lid hinged on top of the containment and processing tank, for allowing closing of the containment and processing tank and loading of basic products into the containment and processing tank upon opening of the lid.

13. The machine according to claim 1, wherein the at least one first airflow intake cavity includes a plurality of first airflow intake cavities.

14. The machine according to claim 1, wherein the at least one second airflow release cavity includes a plurality of second airflow release cavities.

* * * * *